(12) United States Patent
Bauer et al.

(10) Patent No.: US 8,930,088 B2
(45) Date of Patent: Jan. 6, 2015

(54) METHOD FOR POSITIONING AT LEAST ONE COMPONENT, IN PARTICULAR A SEAT, IN OR ON AN AIRCRAFT OR SPACECRAFT, AND AIRCRAFT OR SPACECRAFT

(75) Inventors: Hans-Achim Bauer, Hamburg (DE); Andre Zybala, Hanstedt (DE)

(73) Assignee: Airbus Operations GmbH, Hamburg (DE)

( * ) Notice: Subject to any disclaimer, the term of this patent is extended or adjusted under 35 U.S.C. 154(b) by 795 days.

(21) Appl. No.: 12/968,593

(22) Filed: Dec. 15, 2010

(65) Prior Publication Data

US 2011/0166751 A1 Jul. 7, 2011

Related U.S. Application Data

(60) Provisional application No. 61/286,502, filed on Dec. 15, 2009.

(30) Foreign Application Priority Data

Dec. 15, 2009 (DE) .......................... 10 2009 054 698

(51) Int. Cl.
*G06F 7/00* (2006.01)
*G06F 17/00* (2006.01)

(52) U.S. Cl.
USPC .................. 701/49; 701/13; 701/3; 701/531; 701/155; 701/175

(58) Field of Classification Search
CPC .. B60N 2/0248; B60N 2/0244; B60N 2/0232; B60N 2/0252; B60Q 2300/112
USPC ............ 701/13, 3, 531, 155, 175; 700/28, 54; 342/357.29, 357.42, 357.48, 357.59
See application file for complete search history.

(56) References Cited

U.S. PATENT DOCUMENTS

| | | | |
|---|---|---|---|
| 5,854,591 A * | 12/1998 | Atkinson ........................ | 725/76 |
| 6,614,126 B1 * | 9/2003 | Mitchell ........................ | 307/9.1 |
| 7,496,361 B1 * | 2/2009 | Mitchell et al. ............... | 455/423 |
| 8,325,023 B2 * | 12/2012 | Kohlmeier-Beckmann et al. ........................ | 340/286.06 |
| 8,348,455 B2 * | 1/2013 | Kessler ........................ | 362/227 |
| 8,385,339 B1 * | 2/2013 | Ibrahim ........................ | 370/390 |
| 8,401,742 B2 * | 3/2013 | Schliwa et al. ................. | 701/49 |
| 2002/0195523 A1 * | 12/2002 | Cawley ....................... | 244/118.6 |
| 2003/0075964 A1 * | 4/2003 | Piaulet et al. ............ | 297/362.11 |
| 2006/0003297 A1 | 1/2006 | Wiig et al. | |

(Continued)

FOREIGN PATENT DOCUMENTS

| | | |
|---|---|---|
| DE | 102007052598 | 5/2008 |
| DE | 102007004829 | 8/2008 |
| DE | 102009014606 | 10/2010 |

OTHER PUBLICATIONS

German Office Action, Dec. 15, 2009.

*Primary Examiner* — Ian Jen
(74) *Attorney, Agent, or Firm* — Greer, Burns & Crain Ltd.

(57) ABSTRACT

The present invention provides methods for positioning at least one component, in particular a seat, in or on an aircraft or spacecraft comprising the following steps: controlling at least one light source of the aircraft or spacecraft to display at least one desired position of at least one component; and positioning the at least one component in the at least one desired position displayed.

13 Claims, 4 Drawing Sheets

(56) References Cited

U.S. PATENT DOCUMENTS

2006/0032979 A1\* 2/2006 Mitchell et al. ............ 244/118.6
2006/0103193 A1\* 5/2006 Kramer ...................... 297/217.3
2006/0246892 A1\* 11/2006 vonDoenhoff et al. ....... 455/427
2006/0261970 A1\* 11/2006 Colacecchi ................ 340/686.1
2007/0061847 A1\* 3/2007 Callahan et al. ................ 725/76
2009/0010864 A1 1/2009 Banowski et al.

\* cited by examiner

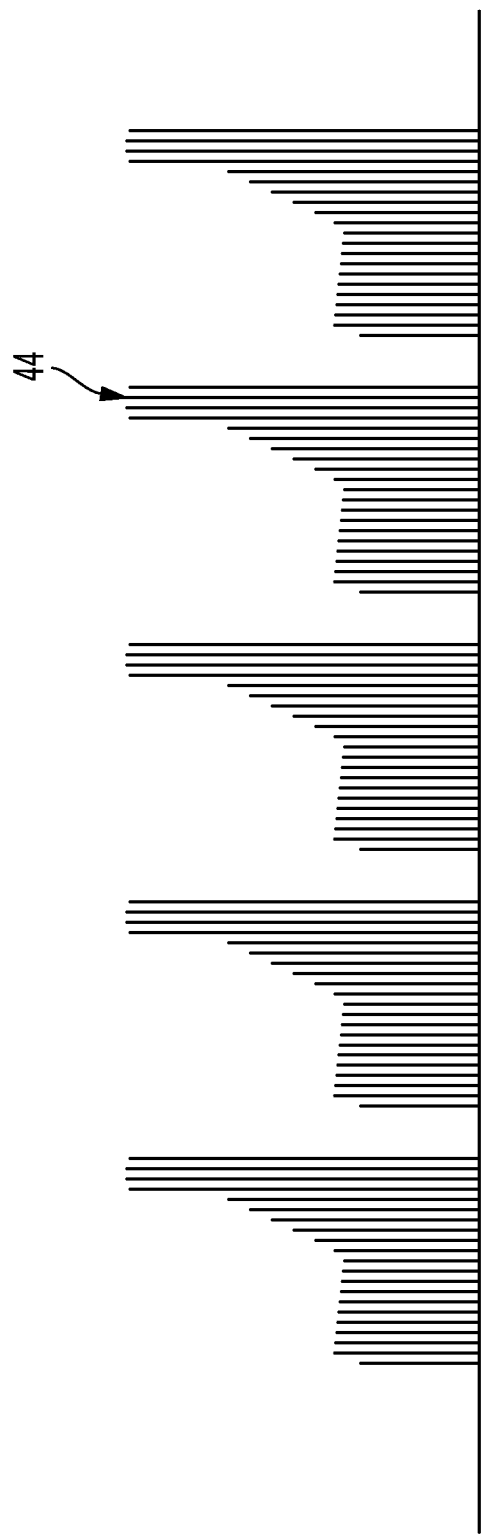

METHOD FOR POSITIONING AT LEAST ONE COMPONENT, IN PARTICULAR A SEAT, IN OR ON AN AIRCRAFT OR SPACECRAFT, AND AIRCRAFT OR SPACECRAFT

CROSS-REFERENCE TO RELATED APPLICATIONS

This application claims the benefit of U.S. Provisional Application No. 61/286,502, filed Dec. 15, 2009 and German Patent Application No. 10 2009 054 698.7, filed Dec. 15, 2009, the entire disclosures of which are herein incorporated by reference.

FIELD OF THE INVENTION

The present invention relates to a method for positioning at least one component, in particular a seat, in or on an aircraft or spacecraft, and to an aircraft or spacecraft.

Although they can be applied to any aircraft or spacecraft and components, the present invention and the problem on which it is based will be described in further detail in relation to seats for passengers in an aircraft.

According to a solution known internally to the applicant, seats for passengers are mounted on a rail system in the cabin of the aircraft. The rails of the rail system usually comprise a 2.54 cm grid in the longitudinal direction of the cabin, which grid can be brought into engagement with the seats using locking means to lock the seats in different positions along the rails. It is necessary to be able to position the seats in a flexible manner in order to be able to meet different customer requirements.

In the above-described case, the fact that the position of each seat must be transferred by hand from a customer-specific mounting layout to the cabin and marked therein has proved problematic. This is comparatively labour-intensive and prone to error. The incorrect positioning of a seat can have the result that a plurality of further seats must also be repositioned, which results in a considerable additional cost.

SUMMARY OF THE INVENTION

An object of the present invention is therefore to provide an improved method and/or an improved aircraft or spacecraft in which the above-mentioned drawbacks are at least reduced.

This object is achieved according to the invention by a method with the features of claim 1 and/or by an aircraft or spacecraft with the features of claim 10.

Accordingly, a method is provided for positioning at least one component, in particular a seat, in or on an aircraft or spacecraft, comprising the following steps: controlling at least one light source of the aircraft or spacecraft to display at least one desired position of at least one component; and positioning the at least one component in the at least one desired position displayed.

An aircraft or spacecraft is also provided which comprises the following: at least one light source; and a control device which is set up to control the light source to display at least one desired position for positioning at least one component, in particular a seat.

The present invention is based on the idea that in many cases a plurality of light sources are already present in a passenger aircraft in particular and these can be used in particular for positioning, for example, seats in such a way that one of the plurality of light sources is switched on and the seat is then positioned either in direct proximity to the light source itself or in the region of a reflection point which generates the light source on another object. In this way, the costly transfer, described at the outset, of customer-specific mounting layouts is omitted, including the process of marking by hand. A method of this type is also less prone to error because it is automated.

Advantageous embodiments and improvements of the invention can be found in the subclaims.

According to a preferred development of the method according to the invention, the light source is switched from a standard mode, in which it carries out passenger-related functions, into a positioning mode, in which it displays the desired position, for the positioning procedure. The light source is therefore assigned a dual function, as a result of which no additional components are necessary to display the desired position of the seats. 'Passenger-related functions' are understood to mean the provision of reading lights or on-board entertainment and the display of escape routes or any other safety-related information, for example.

According to a preferred development of the method according to the invention, the light source is formed by at least one LED (Light Emitting Diode) of an escape route lighting system which comprises a plurality of LEDs arranged in a substantially linear manner and is arranged on the floor of a cabin portion of the aircraft or spacecraft. Escape route lighting systems of this type are located in direct proximity to the possible desired positions and for this reason may make a simple display possible.

According to a preferred development of the method according to the invention, the light source is formed by at least one LED of a reading lamp of a plurality of reading lamps, preferably arranged in a substantially linear manner, which are arranged in the overhead region of a cabin portion of the aircraft or spacecraft. The LED generates for example a reflection on the cabin floor, which reflection represents the desired position.

According to a preferred development of the method according to the invention, the light source is formed by at least one laser device of a plurality of laser devices arranged in the aircraft or spacecraft. The laser light sources advantageously make very exact marking possible.

According to a preferred development of the method according to the invention, the component is locked in the displayed desired position after the positioning procedure. This completes the mounting procedure.

According to a preferred development of the method according to the invention, the desired position is read out by a memory. On the one hand, it is possible to form the memory as a memory card, for example as a compact flash card, which contains the desired positions of the components in accordance with customer requirements and is connected to a control device of the light source prior to the positioning procedure. On the other hand, the control device may itself comprise the memory. The desired positions in accordance with customer requirements are then installed on the memory of the control device via a cable or wirelessly, for example by a portable computer.

According to a preferred development of the method according to the invention, the light source is switched from the standard mode into the positioning mode by a terminal, for example a touch panel, which is also used to display and input passenger-related information. According to this development, the touch panel, which is typically already present in the aircraft, is assigned a dual function, whereby additional components can be saved. A touch panel is conventionally used to display passenger calls (PAX calls), control the lighting and control the on-board entertainment, for example to control the safety video.

According to a preferred development of the method according to the invention, after the at least one component has been positioned an actual position thereof is compared with the desired position. Any difference between these can be displayed to an operator. This information can, for example, also be displayed on the above-mentioned touch panel.

According to a preferred development of the method according to the invention, an actual position of the component is determined by means of an electromagnetic measuring process and/or by means of a scanning process. In the present case, 'scanning process' is understood in particular to mean that the distance is measured between the contour of a test object (for example, a cabin floor region) which comprises the component, the actual position of which is to be determined, and the scanning sensor. The measurement may, in particular, be made by means of electromagnetic waves which are reflected by the test object.

According to a preferred development of the method according to the invention, an elevation profile of the test object is determined during the scanning process. As a result of this, seats in a cabin portion can be easily detected, since the height thereof varies comparatively greatly.

According to a preferred development of the method according to the invention, an actual position of the component is determined by means of at least one camera and an image recognition process. The camera is preferably also set up for monitoring of a cabin region of the aircraft or spacecraft, for example by the pilots or flight attendants. Accordingly, the camera takes on a dual function, whereby components can be saved.

According to a preferred development of the method according to the invention, the light source is switched from the positioning mode back into the standard mode after the positioning procedure.

According to a preferred development of the aircraft or spacecraft according to the invention, the control device is set up to switch the light source between a standard mode in which it carries out passenger-related functions and a positioning mode in which it displays the desired position.

According to a preferred development of the aircraft or spacecraft according to the invention, the light source is formed as at least one LED of an escape route lighting system which comprises a plurality of LEDs arranged in a substantially linear manner and is arranged on the floor of a cabin portion of the aircraft or spacecraft.

According to a preferred development of the aircraft or spacecraft according to the invention, the light source is formed as at least one LED of a reading lamp of a plurality of reading lamps preferably arranged in a substantially linear manner which is arranged in the overhead region of a cabin portion of the aircraft or spacecraft.

According to a preferred development of the aircraft or spacecraft according to the invention, a measuring unit is provided together with a sensor which is set up to measure the actual position of the component and also a management unit which is set up to compare the actual position and the desired position with one another and to generate a warning signal for an operator if the difference between the actual position and the desired position exceeds a threshold value.

A method for determining an actual position of a component in an aircraft or spacecraft is also provided, an elevation profile of a cabin region comprising the component being determined.

The described advantages and developments of the method apply analogously to the aircraft or spacecraft.

BRIEF DESCRIPTION OF THE DRAWINGS

In the following, the invention is described in further detail on the basis of embodiments with reference to the accompanying figures, in which:

FIG. 4 shows an elevation profile according to one embodiment of the present invention.

DESCRIPTION OF EXEMPLARY EMBODIMENTS

Figure 1:
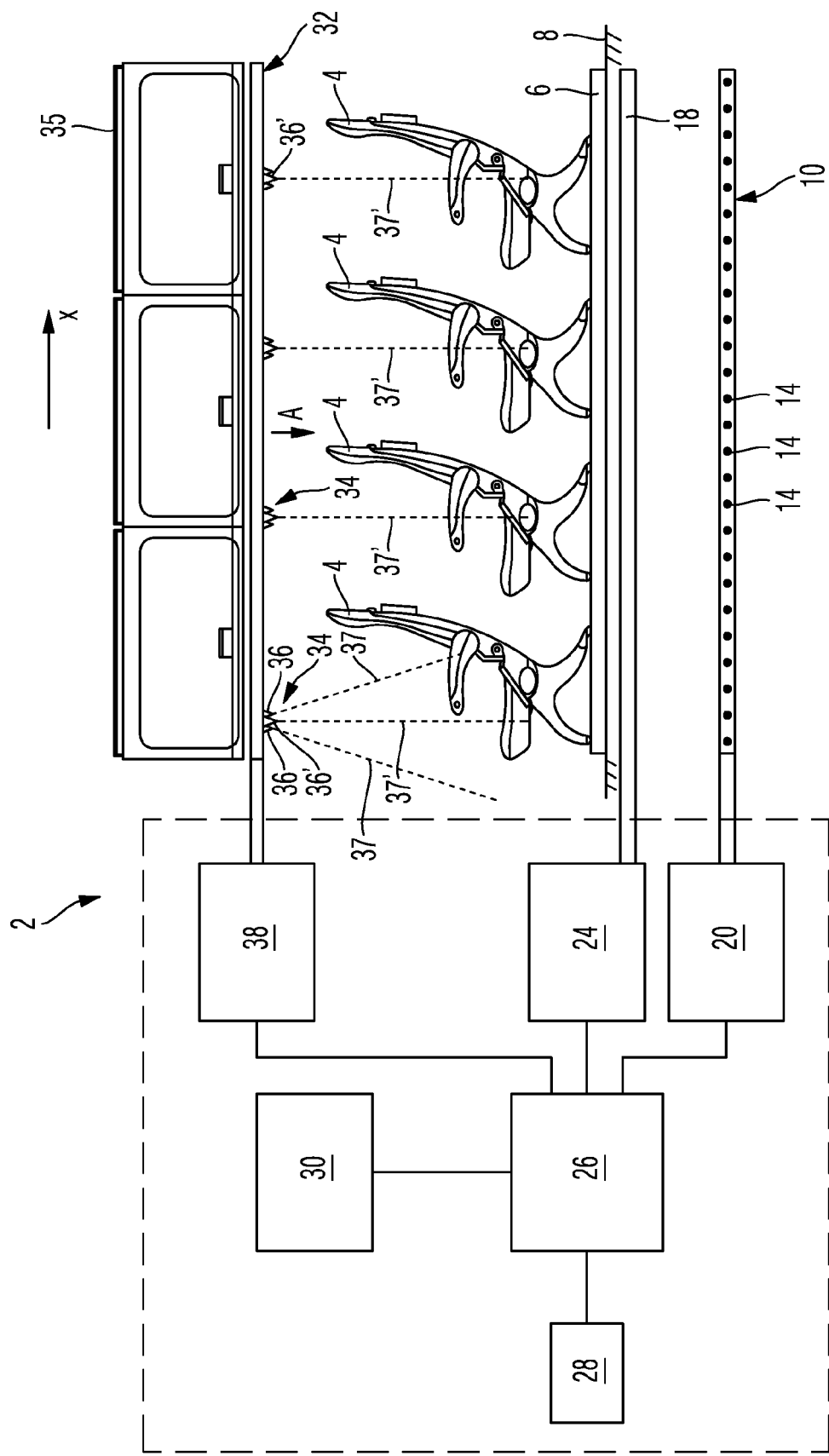
FIG. 1 shows a detail of an aircraft according to one embodiment of the present invention.

In the figures, like reference numerals denote like or functionally equivalent components.

Figure 2:
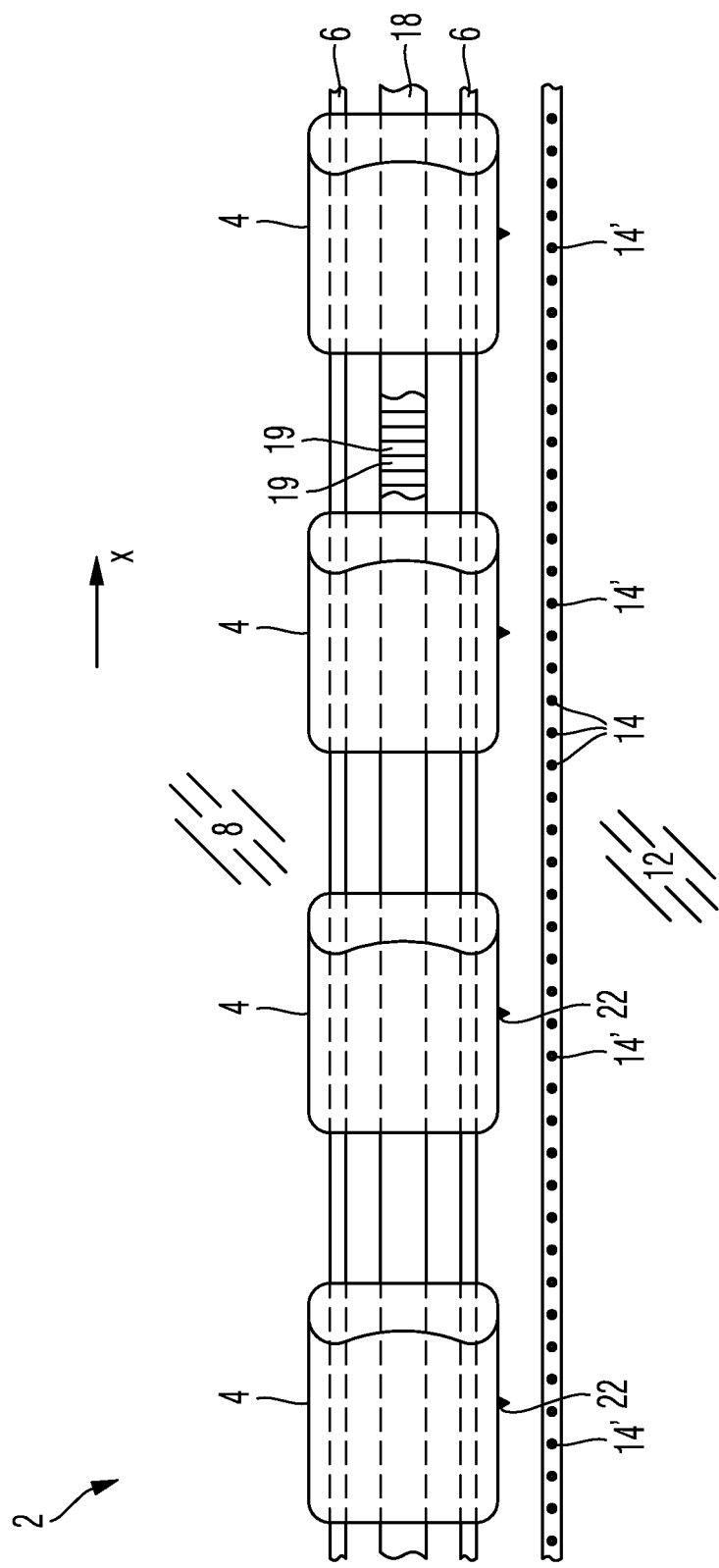
FIG. 2 shows a view A from FIG. 1.

FIG. 1 shows schematically a detail of an aircraft according to one embodiment of the present invention and FIG. 2 shows a view A from FIG. 1.

The cabin portion 2 shown comprises a plurality of seats 4 for passengers, which seats are initially positioned on rails 6 in the longitudinal direction X of the aircraft for mounting purposes and are subsequently locked. In addition, it is pointed out that the seats 4 in FIGS. 1 and 2 can of course be rows of multiple seats, in particular rows of three seats.

The floor 8 of the cabin portion 2 bears the rails 6 and also comprises an escape route lighting system 10 in the form of a lighting strip. For the sake of clarity, in FIG. 1 the escape route lighting system 10 is shown swung out from the plane of the floor 8. As shown in FIG. 2, the escape route lighting system 10 delimits a, for example, central aisle 12 of the cabin portion 2. The escape route lighting system 10 comprises a plurality of LEDs 14, 14' which are arranged in a substantially linear manner one behind the other in the X direction and guide passengers fleeing the cabin in an emergency. The escape route lighting system 10 is connected in terms of signalling to a schematically shown control unit 16, the precise function of which is described in further detail below.

Preferably, a schematically shown sensor 18 is also provided in the region of the floor 8, which sensor can together with a measuring unit 24 measure the actual position of each seat 4 in the X direction, in particular by electromagnetic means, by cooperating with test objects attached to the seats 4 in each case. For example, the sensor 18 can be formed using a plurality of members 19 (shown in a partial section in FIG. 2) arranged one behind the other in the X direction, the inductance of which members varies depending on whether or not a seat 4 is arranged above them. In this way, the X position of the seats 4 can easily be measured. The measuring unit 24 is a component of the control device 16 and is connected in terms of signalling to both the control device and the sensor 18.

Figure 3:
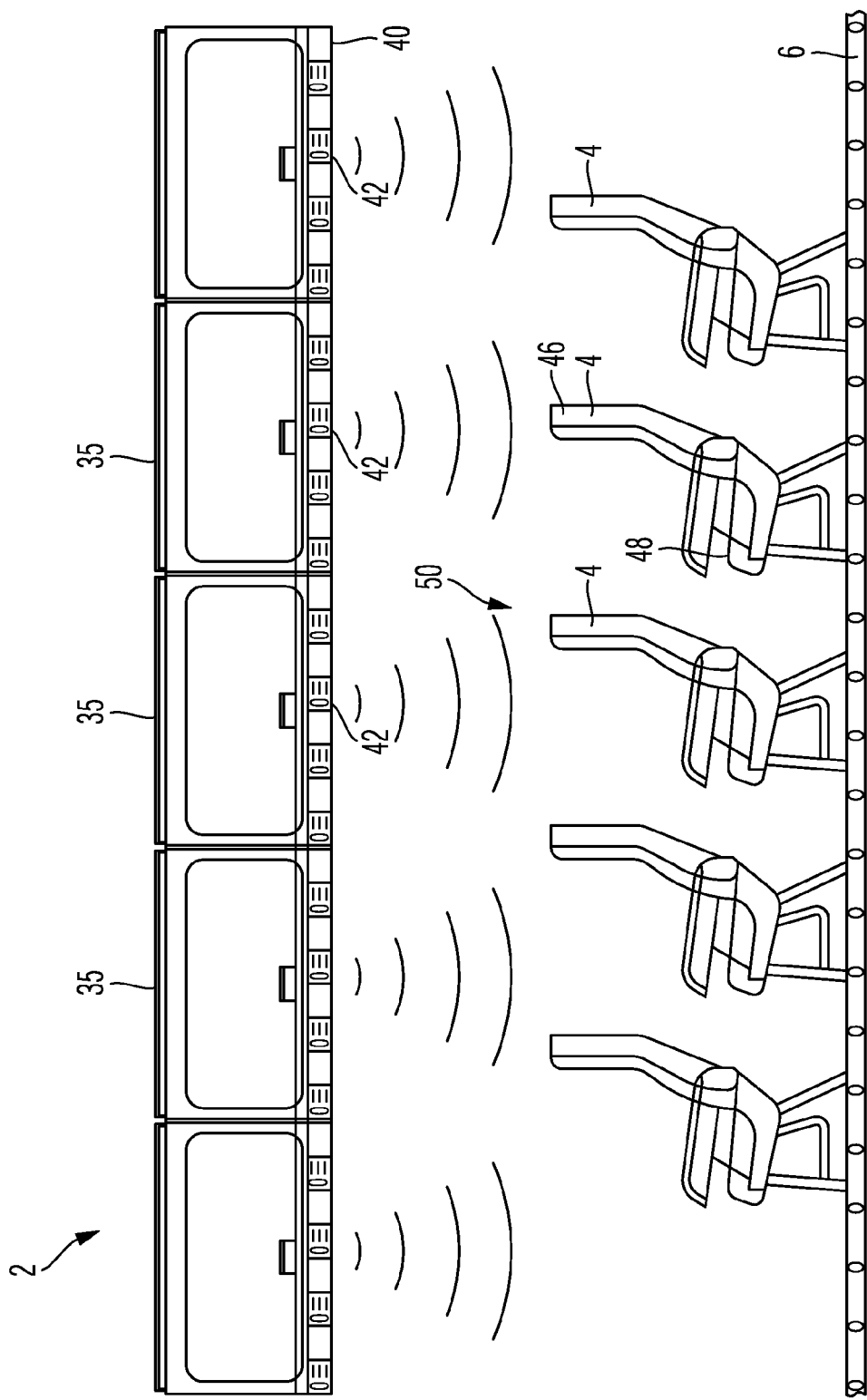
FIG. 3 shows a portion of a cabin from FIG. 1.

Other measuring processes are of course also conceivable, for example a scanning process or image recognition process, as shown in FIGS. 3 and 4.

FIG. 3 shows the cabin portion 2 from FIG. 1. Sensors 42 are arranged at uniform intervals in the X direction in a supply duct 40 in the region of overhead luggage compartments 35 of the cabin portion 2. The sensors 42 are set up to detect an elevation profile 44 of a cabin region 50 beneath the supply duct 1. The elevation profile 44 describes the contour of the seats 4 and is shown in FIG. 4. The elevation profile 44 results for example from the fact that the backrest 46 of each seat 4 is at a smaller distance from the sensor 42, arranged overhead in each case, than the seat surface 48 of each seat 4.

The sensors 42 can each be formed as ultrasonic transmitters/receivers, infrared transmitters/receivers and/or laser transmitters/receivers, for example.

In the case of the embodiment according to FIGS. 3 and 4—i.e. when the above-described scanning process is selected instead of the electromagnetic measuring process—the sensors 42 are connected in a manner not shown in further detail to the measuring unit 24, which determines the actual position of the seats 4 on the basis of the detected elevation profile.

Alternatively, one or more cameras can also be used as sensors 42. The images supplied by the cameras 42 are evaluated by the measuring unit 24 by means of an image recognition process, in order to determine the actual position of the seats 4 in each case. A camera 42, for example a webcam, additionally has the advantage that it can be assigned a dual function, as in addition to the mentioned detection of the actual position of the seats 4, it can also be used for monitoring of the cabin region 50 by the pilots or flight attendants, for example in order to be able to intervene quickly in emergencies.

Returning now to FIG. 1, a control unit 20 is shown here as a component of the control device 16 which is connected in terms of signalling to the escape route lighting system 10 and is set up to switch all the LEDs 14, 14' off together in a standard mode and to switch each LED 14, 14' on or off independently of the other LEDs 14, 14' in each case in a positioning mode or to switch all the LEDs 14, 14' on together in an emergency mode. In the positioning mode, only the LEDs 14' which correspond to the desired positions of the seats 4 to be positioned are switched on. A marking 22, which for purposes of positioning in the X direction is made to correspond to the LED 14' which is switched on in each case, can be applied to each seat 4 by displacing the seat 4' along the rails 6. The seat 4 can subsequently be firmly locked on the rails 6.

The control device 16 further comprises a management unit 26 which is connected in terms of signalling to the control unit 20 and the measuring unit 24. The management unit 26 is typically further connected in terms of signalling to a plurality of cabin systems, for example the aircraft conditioning system or the on-board entertainment system, and controls these. The management unit 26 can therefore be a cabin management system which is also referred to as a cabin information and data system (CIDS).

The management unit 26 is set up to compare the actual position of each seat 4 with the desired position and to generate a warning signal if the difference between a desired position and an actual position exceeds a predetermined threshold value. This evaluation is preferably carried out after the positioning of each seat 4.

In particular, the management unit 26 is connected in terms of signalling to a terminal 28, for example in the form of a touch screen. On the one hand, the touch screen 28 makes it possible for desired variables, for example the desired cabin temperature or the desired cabin lighting, to be input by the cabin staff. On the other hand, the touch screen 28 displays various items of information, for example the actual temperature or the actual cabin lighting. On the touch screen 28 the LEDs 14, 14' can further be switched between the standard mode and the positioning mode by means of the control unit 20. In addition, the touch screen 28 can be set up to show graphically a cabin layout, where it displays the previously positioned seats 4 and the wrongly positioned seats 4, and thus to indentify in particular those seats for which a warning signal has been generated by the management unit 26.

The control device 16 further comprises a memory 30 on which customer-specific desired positions of the seats 4 are stored. The memory 30 is preferably formed as a compact flash card and is connected to the management unit 26 only for purposes of positioning the seats 4 and is later removed therefrom. However, it is not absolutely necessary to remove the memory 30, which can also remain in the control device 16.

After the seats 4 have been positioned and optionally an evaluation has been carried out by the management unit 26, the control device 20, together with the LEDs 14, 14', is switched back into the standard mode, preferably by means of the touch screen 28.

In addition or as an alternative to the escape route lighting system 10, a reading lighting system 32 comprising a plurality of reading lamps 34 arranged one behind the other substantially in the X direction can also be provided in the region of the overhead luggage compartments 35. The reading lamps 34 may comprise a plurality of LEDs 36, 36', each of these LEDs 36, 36' being adapted to cast a comparatively small cone of light 37, 37' onto a seat 4 to be positioned or onto the floor 8.

The control device 16 according to this additional or alternative configuration comprises a control unit 38 which is connected in terms of signalling to the reading lighting system 32 and the management unit 26. The control device 38 is set up in such a way that it controls in a standard mode the LEDs 36, 36' of a reading lamp in accordance with the lighting requirements of each passenger, i.e. light on/off/dimmed, for example. A positioning mode is further provided in which only specific LEDs 37' are switched to produce the above-mentioned cone of light 37' as a function of desired positions of the seats 4 to be mounted. For positioning in the X direction, for example the marking 22 of a respective seat 4 may be made to correspond to a respective cone of light 37'. The control unit 38 receives the desired positions in the manner described above for the control unit 20.

Mini-projectors or lasers which are set up to display the desired positions on a respective seat 4 or on the floor 8 can also be used instead of reading lamps 34.

The developments and embodiments of the method described in the present case can be applied analogously to the aircraft or spacecraft and vice versa.

Although the present invention has been described with reference to preferred embodiments, it is not limited thereto and may be modified in various ways.

LIST OF REFERENCE NUMERALS 2 cabin portion
4 seat
6 rail
8 floor
10 escape route lighting system
12 aisle
14 LED
14' LED
16 control device
18 sensor
20 control unit
22 marking
24 measuring unit
26 management unit
28 touch screen
30 memory 32 reading lighting system
34 reading lamps
35 overhead luggage compartments
36 LED
36' LED
37 cone of light
37' cone of light
38 control unit
40 supply duct
42 sensor
44 elevation profile
46 backrest
48 seat surface
50 cabin region
X longitudinal direction

The invention claimed is:

1. A method for positioning at least one component, in particular a seat, in or on an aircraft or spacecraft comprising the following steps:
controlling at least one light source of the aircraft or spacecraft to display at least one desired position of at least one component, wherein the light source is formed by at least one LED of an escape route lighting system which comprises a plurality of LEDs arranged in a substantially linear manner and is arranged on an aisle portion of the floor of a cabin portion of the aircraft or spacecraft; and
positioning the at least one component in the at least one desired position displayed.

2. The method according to claim 1, wherein the light source is switched from a standard mode, in which it carries out passenger-related functions, into a positioning mode, in which it displays the desired position, for the positioning procedure.

3. The method according to claim 1, wherein the light source is formed by at least one LED of a reading lamp of a plurality of reading lamps which are arranged in the overhead region of a cabin portion of the aircraft or spacecraft.

4. The method according to claim 1, wherein the desired position is read out by a memory.

5. The method according to claim 1, wherein after the at least one component has been positioned, an actual position thereof is compared with the desired position thereof.

6. The method according to claim 1, wherein an actual position of the component is determined by means of a scanning process, a distance between a test object, which comprises the component, and a scanning sensor being measured.

7. The method according to claim 6, wherein an elevation profile of the test object is determined during the scanning process.

8. The method according to claim 1, wherein an actual position of the component is determined by means of at least one camera and an image recognition process and the camera is further set up to monitor a cabin portion of the aircraft or spacecraft.

9. An aircraft or spacecraft, comprising:
at least one light source, wherein the light source is formed as at least one LED of an escape route lighting system which comprises a plurality of LEDs arranged in a substantially linear manner and is arranged on an aisle portion of the floor of a cabin portion of the aircraft or spacecraft; and
a control device which is set up to control the light source to display at least one desired position for positioning at least one component, in particular a seat.

10. The aircraft or spacecraft according to claim 9, wherein the control unit is set up to switch the light source between a standard mode, in which it carries out passenger-related functions, into a positioning mode, in which it displays the desired position.

11. The aircraft or spacecraft according to claim 9, wherein the light source is formed by at least one LED of a reading lamp of a plurality of reading lamps which is arranged in the overhead region of a cabin portion of the aircraft or spacecraft.

12. Aircraft or spacecraft according to claim 9, wherein a measuring unit including a sensor which is set up to measure the actual position of the component is provided and a management unit which is set up to compare the actual and desired positions of the component with one another and to generate a warning signal for an operator if the difference between an actual position and a desired position exceeds a predetermined threshold is also provided.

13. A method for determining an actual position of a component in an aircraft or spacecraft, wherein an elevation profile of a cabin region which comprises the component is determined by means of sensors arranged at uniform intervals in the region of overhead luggage compartments, and wherein the sensors are formed as ultrasonic transmitters/receivers, infrared transmitters/receivers and/or laser transmitters/receivers.

* * * * *